United States Patent
Derbeko et al.

(10) Patent No.: US 10,320,828 B1
(45) Date of Patent: Jun. 11, 2019

(54) EVALUATION OF SECURITY IN A CYBER SIMULATOR

(71) Applicant: EMC Corporation, Hopkinton, MA (US)

(72) Inventors: Philip Derbeko, Modiin (IL); Alon Grubshtein, Lehavim (IL); Anton Pavlinov, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/870,053

(22) Filed: Sep. 30, 2015

(51) Int. Cl.
*G06F 21/55* (2013.01)
*G06F 21/56* (2013.01)
*G06F 21/57* (2013.01)
*H04L 29/06* (2006.01)

(52) U.S. Cl.
CPC ........ *H04L 63/1433* (2013.01); *G06F 21/566* (2013.01); *G06F 21/577* (2013.01); *H04L 63/1416* (2013.01); *H04L 63/1425* (2013.01); *G06F 21/55* (2013.01)

(58) Field of Classification Search
CPC ............ H04L 63/1416; H04L 63/1425; H04L 63/1433; H04L 63/1441; H04L 63/1408; H04L 63/145; H04L 63/1458; H04L 63/14; H04L 63/1466; H04L 41/16; G06F 21/55; G06F 21/566; G06F 21/53; G06F 21/56; G06F 21/577
See application file for complete search history.

(56) References Cited

U.S. PATENT DOCUMENTS

| | | | | |
|---|---|---|---|---|
| 8,250,654 B1* | 8/2012 | Kennedy | ................. | H04L 41/22 713/187 |
| 9,043,535 B1* | 5/2015 | Derbeko | ............... | G06F 3/0631 711/103 |
| 2006/0191010 A1* | 8/2006 | Benjamin | ............. | G02F 21/552 726/23 |
| 2007/0150415 A1* | 6/2007 | Bundy | ................. | H04L 9/0866 705/51 |
| 2007/0174915 A1* | 7/2007 | Gribble | ................... | G06F 21/53 726/24 |
| 2008/0271019 A1* | 10/2008 | Stratton | ................ | G06F 21/577 718/1 |
| 2008/0271025 A1* | 10/2008 | Gross | .................. | G06F 11/3051 718/102 |
| 2009/0319247 A1* | 12/2009 | Ratcliffe, III | ...... | G09B 19/0053 703/13 |
| 2012/0072968 A1* | 3/2012 | Wysopal | ............. | G06F 11/3612 726/1 |
| 2012/0240235 A1* | 9/2012 | Moore | ................... | G06F 21/00 726/25 |

(Continued)

*Primary Examiner* — Tae K Kim
(74) *Attorney, Agent, or Firm* — Ryan, Mason & Lewis, LLP

(57) ABSTRACT

A System, Computer Program Product, and Computer-executable method for testing a production system, the System, Computer Program Product, and Computer-executable method including receiving information related to the production system, receiving production data from the production system, creating a virtual production system based off the production system using the received information and the received production data, and analyzing the production system by performing tests on the virtual production system.

15 Claims, 10 Drawing Sheets

(56) References Cited

U.S. PATENT DOCUMENTS

| | | | | |
|---|---|---|---|---|
| 2012/0250686 A1* | 10/2012 | Vincent | .............. | H04L 12/4633 |
| | | | | 370/392 |
| 2013/0091578 A1* | 4/2013 | Bisht | ...................... | G06F 21/53 |
| | | | | 726/25 |
| 2013/0117848 A1* | 5/2013 | Golshan | ................ | G06F 21/566 |
| | | | | 726/23 |
| 2014/0007241 A1* | 1/2014 | Gula | ................... | H04L 63/1433 |
| | | | | 726/25 |
| 2014/0046645 A1* | 2/2014 | White | ................... | G06F 17/509 |
| | | | | 703/13 |
| 2014/0137228 A1* | 5/2014 | Shema | ................. | G06F 21/577 |
| | | | | 726/11 |
| 2014/0215620 A1* | 7/2014 | Hayrynen | ........... | H04L 63/1416 |
| | | | | 726/23 |
| 2015/0047032 A1* | 2/2015 | Hannis | ................ | H04L 63/1491 |
| | | | | 726/23 |
| 2015/0074810 A1* | 3/2015 | Saher | ................. | H04L 63/1416 |
| | | | | 726/23 |

* cited by examiner

US 10,320,828 B1

EVALUATION OF SECURITY IN A CYBER SIMULATOR

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, Computer Program Product, and Computer-executable method for testing a production system, the System, Computer Program Product, and Computer-executable method including receiving information related to the production system, receiving production data from the production system, creating a virtual production system based off the production system using the received information and the received production data, and analyzing the production system by performing tests on the virtual production system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
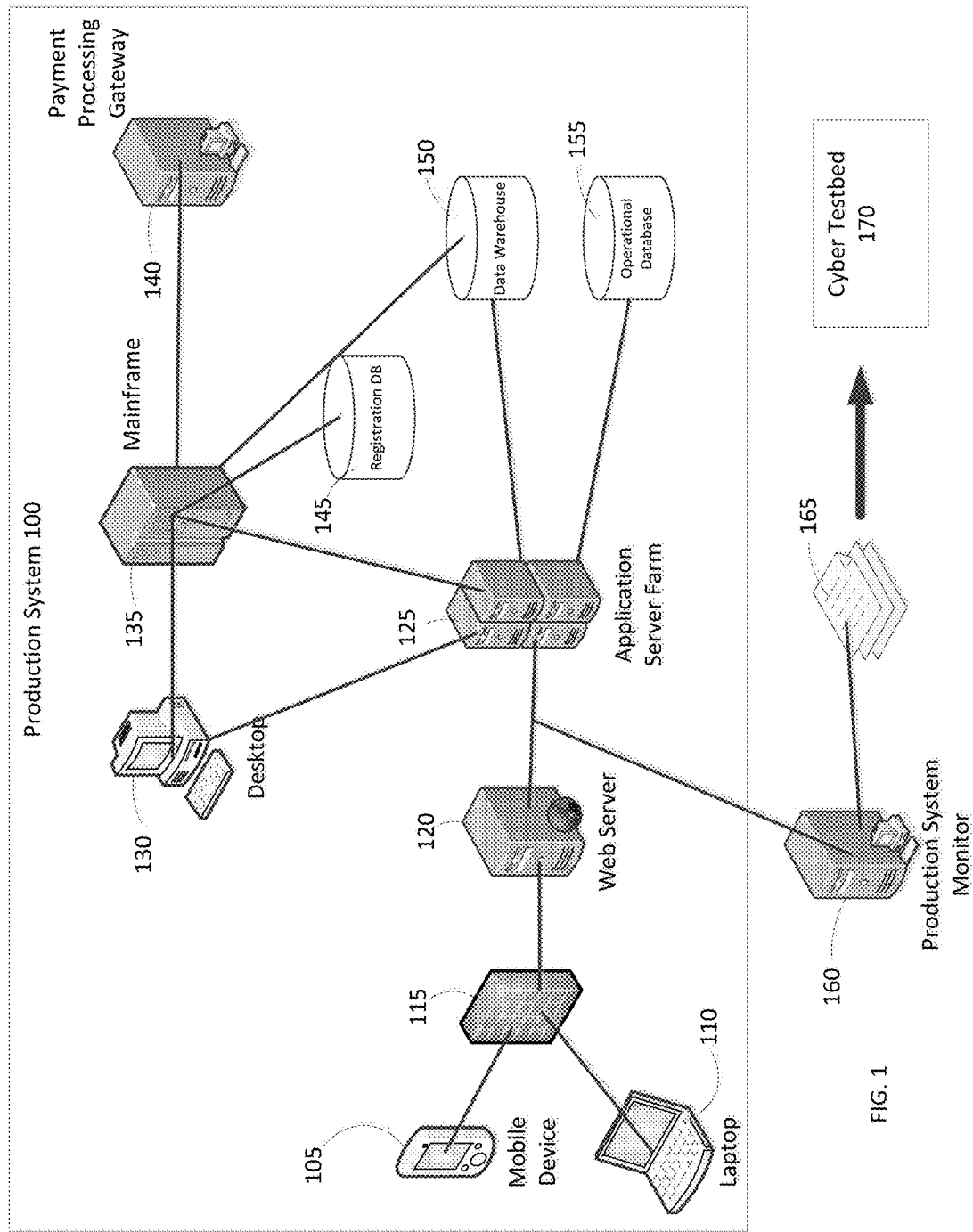
FIG. 1 is a simplified illustration of a cyber testbed analyzing a production system, in accordance with an embodiment of the present disclosure.

Traditionally, companies have extensive computer infrastructure to support their commercial businesses. Typically, on a daily basis, a company's computer infrastructure is exposed to malware and the possibility of cyber-attack from a multitude of entities. Generally, companies try to defend their computer infrastructure by fortifying perceived weaknesses in their computer infrastructure. However, traditionally, individually strengthening portions of a computer infrastructure can only prevent some malware and cyber-attack scenarios. Conventionally, improvements to detecting and/or evaluating security of a customer's computing environment would be beneficial to the data storage industry.

In many embodiments, the current disclosure may enable advanced protection of a customer's computing environment. In various embodiments, the current disclosure may enable a customer to train its Information Technology (IT) personnel in protection and/or prevention techniques to protect the customer's computing environment. In certain embodiments, the current disclosure may enable a customer to test new security products before production deployment. In some embodiments, the current disclosure may enable a customer to run a vulnerability assessment of an existing computing environment. In most embodiments, the current disclosure may enable a customer to test and/or analyze security threats to their computing environment without affecting a production system. In various embodiments, the current disclosure may enable a customer to tighten security by assessing the vulnerability of multiple configurations and/or settings derived from the customer's existing environment.

In most embodiments, the current disclosure may enable creation of a Cyber Testbed. In various embodiments, a cyber testbed may enable representation of a customer's computing environment. In certain embodiments, a cyber testbed may enable a customer to automatically assess its vulnerability to different malware and cyber-attack scenarios. In some embodiments, a cyber testbed may be enabled to execute and/or re-execute multiple vulnerability tests with minimal intervention. In many embodiments, a cyber testbed may be enabled to execute one or multiple vulnerability evaluation procedures on a computing environment and various modifications to the computing environment. In various embodiments, a cyber testbed may be enabled to execute one or multiple "what if" type analysis examining different design changes to a computing environment.

In most embodiments, a cyber testbed may be enabled to provide ratings and/or scores indicating a level of security and/or a level of business continuity achieved by one or multiple configurations of a customer's computing environment. In various embodiments, a cyber testbed may be enabled to provide recommendations and/or solutions to protect against and/or prevent a customer's computing environment from being affected by various malware and/or cyberattacks. In some embodiments, a cyber testbed may be enabled to provide a security score and a business continuity score. In most embodiments, a security score may indicate the success of an attack on a computing environment. In various embodiments, a lower score may indicate that a computing environment may be more successful at fending off attacks. In certain embodiments, an attack may include introduction of malware, a cyber attack, or any harmful act or software which may compromise the security of a computing environment. In most embodiments, a business continuity score may indicate a computing environment's ability to maintain usability of business applications within a computing environment. In various embodiments, a business continuity score may increase due to facts such as, but not limited to, availability of resources and percentage of up time. In some embodiments, a cyber testbed may enable a user and/or administrator to balance a high level of security (i.e. a low security score) with business usability (i.e. a high business continuity score). In many embodiments, a cyber testbed may enable a user and/or administrator to baseline a computing environment's current capabilities. In various embodiments, once a computing environment's capabilities are baselined, a cyber testbed may enable a user and/or administrator the ability to re-test various configuration changes to improve a computing environment's overall score.

In many embodiments, a business continuity score may include one or more measurements of maintaining successful business activity in a computing environment. In various embodiments, a business continuity score may include one or more measures of availability of one or more resources within a computing score. In certain embodiments, a measure of availability may include, but is not limited to, how many users may have been able to access the computing environment, average access time of the computing environment, average response time of one or more systems within the computing environment, and/or responsiveness of one or more systems within the computing environment. In some embodiments, a business continuity score may include, but is not limited to, percentage of up time for one or more systems in a computing environment. For example, in certain embodiments, a computing environment may be enabled to maintain a full amount of points of a business continuity score if a computing environment may be enabled to maintain a specified up time, such as, but not limited to 99.9999 up time.

In various embodiments, a security score may be comprised of attacks and/or stages of attacks made upon a computing environment. In certain embodiments, a maximized score may be the lowest score possible given an implementation of a computing environment. In most embodiments, a successful attack may increase a security score by one point for non-critical systems within a computing environment. In other embodiments, possible points increased from a cyber attack, malware, and/or threat may vary depending on how new and/or unknown the attack may be. In some embodiments, possible points increased from a cyber attack, malware, and/or threat may vary based on the criticality of an attack.

Traditionally, most security tools that focus on the evaluation of vulnerabilities in a customer's environment rely on known issues and best practices. Generally, these tools inspect a single computer, compare policies and compliance levels with a database of known vulnerabilities, and often use Knowledge Base (KB) articles to provide a limited set of simplistic steps to tighten security, i.e., install patch XYZ. Conventionally, going beyond these steps is often difficult, as the impact of other recommended change cannot be evaluated with such tools.

In most embodiments, a cyber testbed may be enabled to provide a holistic view of a computing environment and may be enabled to improve the security for the entire computing environment instead of just for a single computer. In various embodiments, a cyber testbed may be enabled to determine whether malware would be enabled to move between machines within a computing environment. In certain embodiments, a cyber testbed may be enabled to determine what specific information could be stolen. In other embodiments, a cyber testbed may be enabled to determine whether a new tool may help with defense of company assets and/or protection of the computing environment.

In most embodiments, a cyber testbed may be enabled to perform analysis on a customer's computing environment. In various embodiments, a cyber testbed may be enabled to imitate and/or replicate a customer's production environment. In certain embodiments, a cyber testbed may be enabled to assess vulnerability under one or multiple security scenarios. In some embodiments a security scenario may include malware introduced into a customer's computing environment. In other embodiments, a security scenario may include executing a cyber attack against a customer's computing environment.

In most embodiments, a cyber testbed may be enabled to execute a bank of scenarios on a customer's computing environment. In various embodiments, a bank of scenarios may include injection of actual malware. In certain embodiments, a bank of scenarios may include addition and/or removal of machines and/or services from a computing environment. In other embodiments, a bank of scenarios may include simulation of outside services interacting with a customer's computing environment. In many embodiments, a scenario may be measured as to whether objectives were fulfilled. In various embodiments, success of a scenario may be affected by whether business applications may be available. In other embodiments, success of a scenario may be affected by the performance of business applications during the scenario. In most embodiments, success of a scenario may be affected by a combination of factors mentioned above.

In most embodiments, a cyber testbed may be enabled to grade vulnerability based on the evaluation of a customer's computing environment. In various embodiments, a grade may be a weighted combination of grades from individual scenario executions. In certain embodiments, a cyber testbed may be enabled to provide an ordered list of security improvements for a customer's computing environment. In some embodiments, an ordered list of security improvements may identify areas and/or more heavily weight security improvements based on how much the security improvement would improve the security of a computing environment. In most embodiments, a cyber testbed may be enabled to simulate a customer's production environment with one or multiple improvements suggested by the cyber testbed and extrapolate the results. In various embodiments, recommended sets of changes for a customer's computing environment may take into account maximizing security while minimize impact to business applications. In most embodiments, a user of a cyber testbed may receive a set of recommendations pertaining to their environment that were shown to improve security.

In many embodiments, a cyber testbed may be enabled to measure actual vulnerability of a "not-yet-existing" computing environment. In various embodiments, a cyber testbed may be enabled to inspect and/or holistically examine a computing environment for cyber-attack scenarios, some of which may not involve malware at all, such as, but not limited to, poor network design and/or other flaws. In certain embodiments, a cyber testbed may be enabled to propose and/or evaluate complex scenarios derived from a single computing environment and systematically compare different executions of these complex scenarios.

In most embodiments, a cyber testbed may enable a customer to have hands on training on a replica of their computing environment and/or network. In various embodiments, a cyber testbed may enable a customer to simulate scenarios that may not be possible in a production environment, such as, but not limited to, overload and/or cyber-attack scenarios. In certain embodiments, a cyber testbed may be enabled to store and/or utilize a rich library of threats, scenarios, and/or hypothesis that may be tested against a virtual/replica of a customer's production computing environment. In some embodiments, a user and/or administrator may be enabled to analyze results from testing using the cyber testbed. In other embodiments, a user and/or administrator may be enabled to initialize, and/or manage tests and/or scenarios executed on their virtual/replica computing environment.

In most embodiments, a cyber testbed may be used to determine readiness for cyber attacks, environmental factors, integration with cloud resources, and associated issues. In various embodiments, a cyber testbed may be used to assess the effect of the addition of an application and/or computing system to a customer's computing environment. In certain embodiments, a cyber testbed may be utilized to evaluate incident response and/or may be enabled to provide advanced threat monitoring and/or behavior analysis. In some embodiments, a customer may be enabled to use a cyber testbed to provide training to IT professionals managing a production computing environment.

In many embodiments, a cyber testbed may include multiple modules to facilitate assessment of a customer's computing environment. In various embodiments, a cyber testbed may include a virtualization module, a workflow engine, an interface, an analysis module, a threat library, and Hardware resources. In certain embodiments, hardware resources may include RAM, Cache, and/or access to one or more portions of data storage. In some embodiments, a virtualization module may be enabled to utilize hardware resources to replicate a customer's production computing environment. In other embodiments, a virtualization module may be enabled to virtualize the configuration and/or equipment within a customer's computing environment. In most embodiments, a workflow engine may be enabled to affect time within a virtualized/replicated version of a customer's product computing environment. In various embodiments, a workflow engine may be enabled to speed up, slow down, replay and/or otherwise affect the timeframe of a customer's production computing environment to enable analysis of the computing environment. In certain embodiments, an interface may enable a user and/or administrator to manage functionality of the cyber testbed. In other embodiments, an interface may enable a user and/or administrator to input production data into the virtualization of the production computing environment. In some embodiments, a threat library may include malware, previously known cyber-attack strategy, a known and/or unknown vulnerability, and/or information relating to threats to a computational system. In various embodiments, a threat library may rank and/or score each threat based on many factors including, but not limited to, severity of attack/malware, how recent that attack has become known, and how infectious is the threat.

In most embodiments, a cyber testbed may include an analysis module. In various embodiments, an analysis module may include a hypothesis generator, an anomaly detection module, and/or a scenario generator. In certain embodiments, a hypothesis generator may be enabled to analyze harm to a computing environment and determine the one or multiple reasons for the harm. In other embodiments, an anomaly detection module may be enabled to detect variations in normal operation of a computing environment. In some embodiments, a scenario generator may be enabled to utilize a threat library to create one or multiple scenarios testing the ability of a computing environment to handle threats.

Refer to the example embodiment of FIG. 1. FIG. 1 is a simplified illustration of a cyber testbed analyzing a production system, in accordance with an embodiment of the present disclosure. In this embodiment, production system 100 is a customer's production computing environment. Production system 100 includes mainframe 135, application server farm 125, payment processing gateway 140, and web server 120. Production system 100 includes at least one of desktop computer 130 in communication with other portions of production system 100. Production system includes registration Data Base (DB) 145, data warehouse 150, operational database 155, and firewall 115. Mobile device 105 and laptop 110 are enabled to communicate with other portions of production system 100 through firewall 115.

In this embodiment, production system monitor 160 is enabled to tap into production system 100. Production system monitor 160 is enabled to view, analyze, and/or map the layout of production system 100. Production system monitor 160 is enabled to provide production data 165 to cyber testbed 170. In many embodiments, a production system monitor may be enabled to be a separate data storage system connected to a production system. In various embodiments, a production system monitor may be implemented within one or more portions of a hardware resource that may be a part of the production system. In other embodiments, a production system monitor may be implemented in a cloud resource that may be enabled to communicate with the production system. In most embodiments, a production system monitor may be enabled to separate a production system from a cyber testbed, such that a cyber threat (i.e. malware or other threat) introduced to a cyber testbed may not be able to access the production system. In some embodiments, an "air gap" may be provided between the production system and the cyber testbed. In other embodiments, a cyber testbed may be isolated using network protocols. In various embodiments, a cyber testbed may be isolated using hardware.

As shown, cyber testbed 170 is enabled to create a virtualized/replicated version of production system 100 within cyber testbed 170. Cyber testbed 170 is enabled to perform one or multiple tests and/or run one or multiple scenarios on the virtualized/replicated version of production system 100. Cyber testbed 170 is enabled to utilize production data 165 to accurately mimic production system 100 within cyber testbed 170. Cyber testbed 170 is enabled to augment the timeframe of a virtualized/replicated version of production system 100 to determine current and future behavior of production system 100. Cyber testbed 170 is enabled to determine current and future behavior of production system 100 based on the state of production system 100 and based on outcomes from the introduction of malware, cyberattacks, and/or performance of security scenarios.

Figure 2:
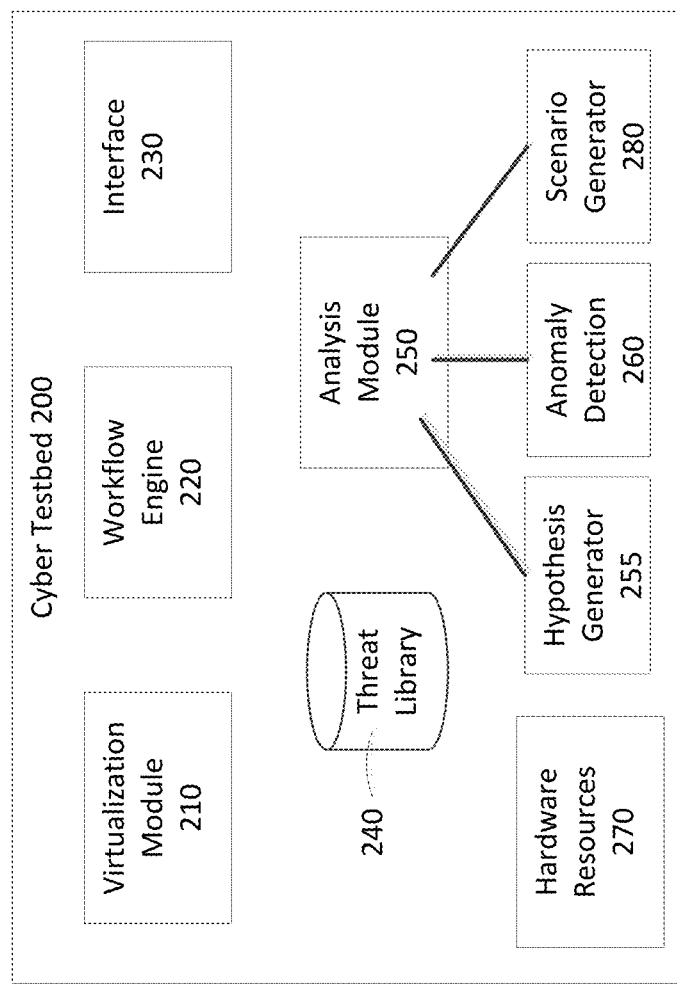
FIG. 2 is a simplified illustration of a cyber testbed system, in accordance with an embodiment of the present disclosure.

Refer to the example embodiment of FIG. 2. FIG. 2 is a simplified illustration of a cyber testbed system, in accordance with an embodiment of the present disclosure. Cyber testbed 200 includes virtualization module 210, workflow engine 220, interface 230, threat library 240, analysis module 250, and hardware resources 270. Hardware resources 270 are enabled to include, but not limited to, compute power, RAM, Cache, and data storage. Virtualization module 210 is enabled to utilize hardware resources 270 to replicate a customer's computing environment. In many embodiments, a user and/or administrator may be enabled to utilize the virtualization module to customize a virtualized computing environment. In some embodiments, a cyber testbed may be enabled to detect and/or reproduce virtually a production system. In other embodiments, a cyber testbed may be enabled to partially detect and/or reproduce virtually a production system while the cyber testbed may enable a user and/or administrator to complete the replication of the production system. Workflow engine 220 is enabled to manage one or multiple virtualizations of a customer's computing environment. Workflow engine 220 is enabled to modulate the time and/or timeframe of a virtualized computing environment. Workflow engine 220 is enabled to perform one or multiple scenarios on a virtualized computing environment utilizing threat library 240.

In this embodiment, interface module 230 is enabled to allow access to cyber testbed 200 and enabled to receive data from one or multiple production systems. In many embodiments, a customer may utilize an interface module to provide production data from a production computing environment to a virtualized computing environment. In various embodiments, a customer may be enabled to utilize an interface to provide inputs and/or feedback to one or more portions of the cyber testbed to modify and/or update configurations of virtual computing environments tested by the cyber testbed.

In this embodiment, threat library 240 is enabled to include, but not limited to, malware, known cyber attacks, profiles of harmful attacks, as well as mappings of effects to different cyber attack scenarios. Analysis module 250 includes hypothesis generator 255, anomaly detection module 260, and scenario generator 280. Hypothesis generator 255 is enabled to utilize threat library 240 to provide information regarding one or more sources of an attack and/or measures enabled to prevent the attack. Anomaly detection module 260 is enabled to analyze a virtual computing environment at one or multiple times or timeframes to determine whether or not a cyber attack and/or malware has been introduced into a virtual computing environment. In many embodiments, a cyber testbed may be enabled to utilize an anomaly detection module on a virtual computing environment to determine whether or not a cyber attack and/or malware may have been introducing into the current production computing system. A user and/or administrator is enabled to use scenario generator 280 to create and/or modify one or multiple scenarios to test a virtual computing environment. Workflow engine 220 is enabled to execute one or multiple scenarios created by scenario generator 280 to test the security and/or business continuity of a virtual computing environment. In many embodiments, a workflow engine may be enabled to perform any number of scenarios continuously to provide more information about the effects one or more attacks and/or failures of a virtualized computing environment.

Figure 3:
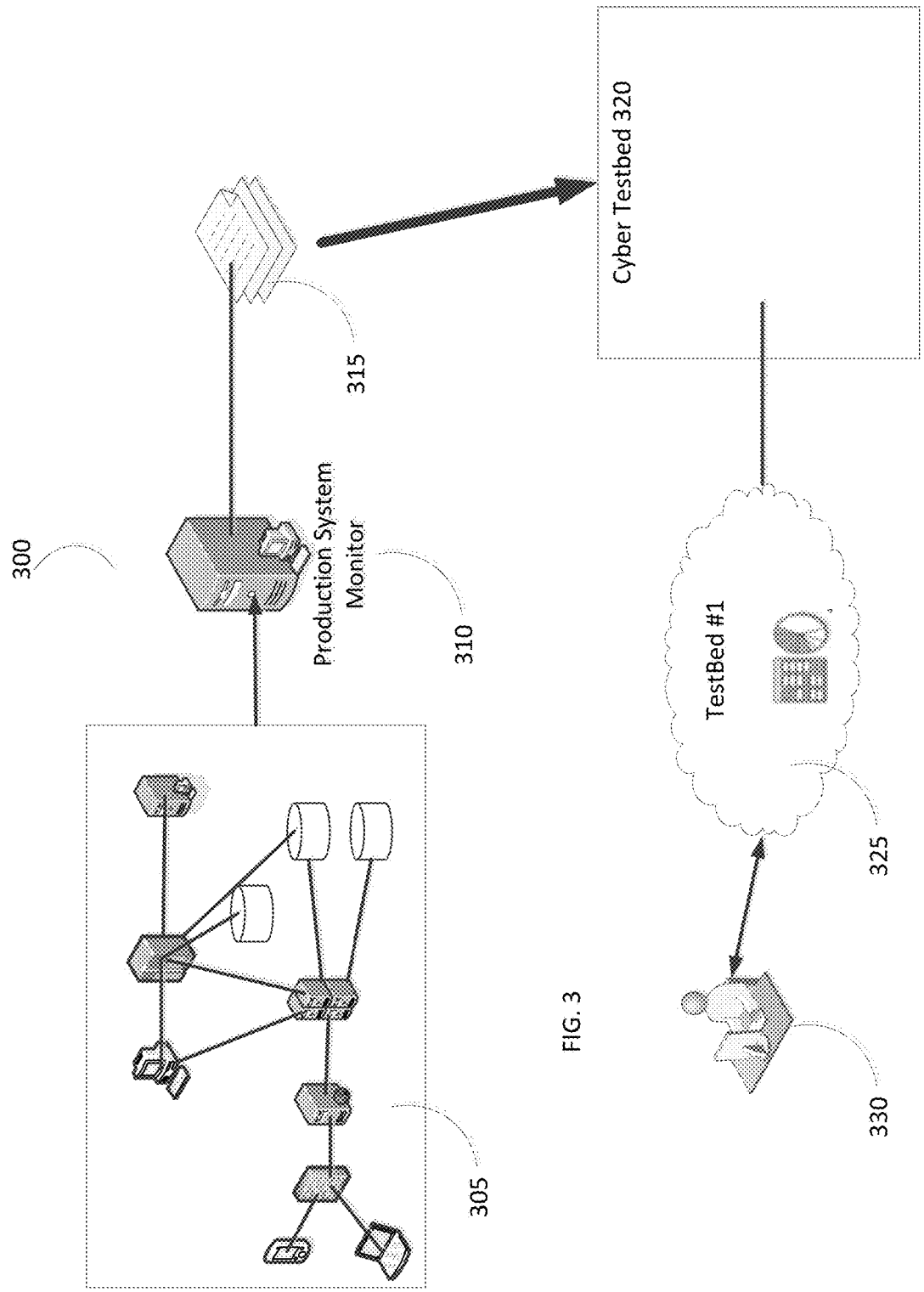
FIG. 3 is a simplified illustration of a cyber testbed analyzing a production system, in accordance with an embodiment of the present disclosure.

Refer to the example embodiment of FIG. 3. FIG. 3 is a simplified illustration of cyber testbed analyzing a production system, in accordance with an embodiment of the present disclosure. System 300 includes production system monitor 310 and cyber testbed 320. Production system monitor 310 is in communication with production system 305. Production system 305 is similar to the production system described in FIG. 1. Production system monitor 310 retrieves information about production system 305, including production data, provides the information to cyber testbed 320 using data files 315. Cyber testbed 320 utilizes data files 315 to replicate virtual production system 325 mimicking the structure and state of production system 305. Cyber testbed 320 is enabled to provide access to virtual production system 325 to user 330. User 330 is enabled to use an access point to monitor, manage, and/or modify virtual production system 325 to gain more knowledge about production system 305.

Figure 4:
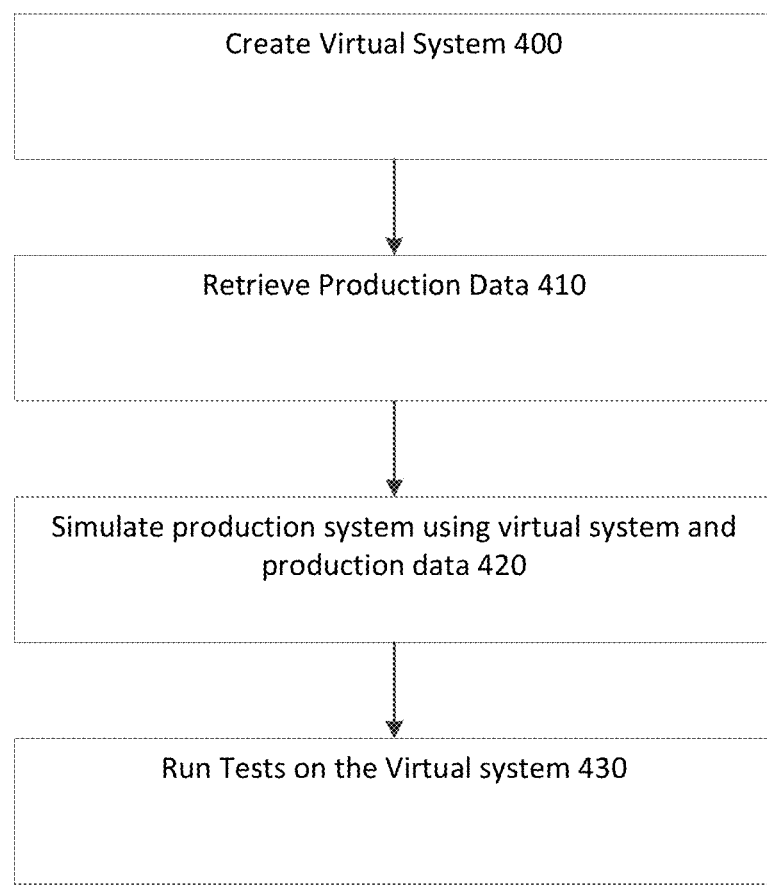
FIG. 4 is a simplified flowchart of a method of utilizing the cyber testbed shown in FIG. 3, in accordance with an embodiment of the present disclosure.

Refer to the example embodiments of FIGS. 3 and 4. FIG. 4 is a simplified flowchart of a method of utilizing the cyber testbed shown in FIG. 3, in accordance with an embodiment of the present disclosure. System 300 includes production system monitor 310 and cyber testbed 320. Production system monitor 310 is in communication with production system 305. Production system monitor 310 retrieves information related to production system 305 and provides the information to cyber testbed 320. Cyber testbed 320 creates virtual production system 325 (Step 400). Production system monitor 310 retrieves production data 315 from production system 305 (Step 410) and provides the production data 315 to cyber testbed 320. User 330 is enabled to monitor, manage, and/or modify virtual production system 325 (Step 420). User 330 is enabled to run tests on the virtual production system 325 (Step 430).

In many embodiments, a user may be enabled to create one or multiple scenarios using a cyber testbed. In various embodiment, a user may be enabled to direct the cyber testbed to execute one or multiple scenarios created on one or more virtual computing environments. In certain embodiments, upon completion of each scenario, a cyber testbed may be enabled to associate a score with the computing environment when executing each scenario. In some embodiments, a cyber testbed may be enabled to provide a security score and/or a business continuity score that may indicate how a computing environment fares while under the stress of a scenario.

Figure 5:
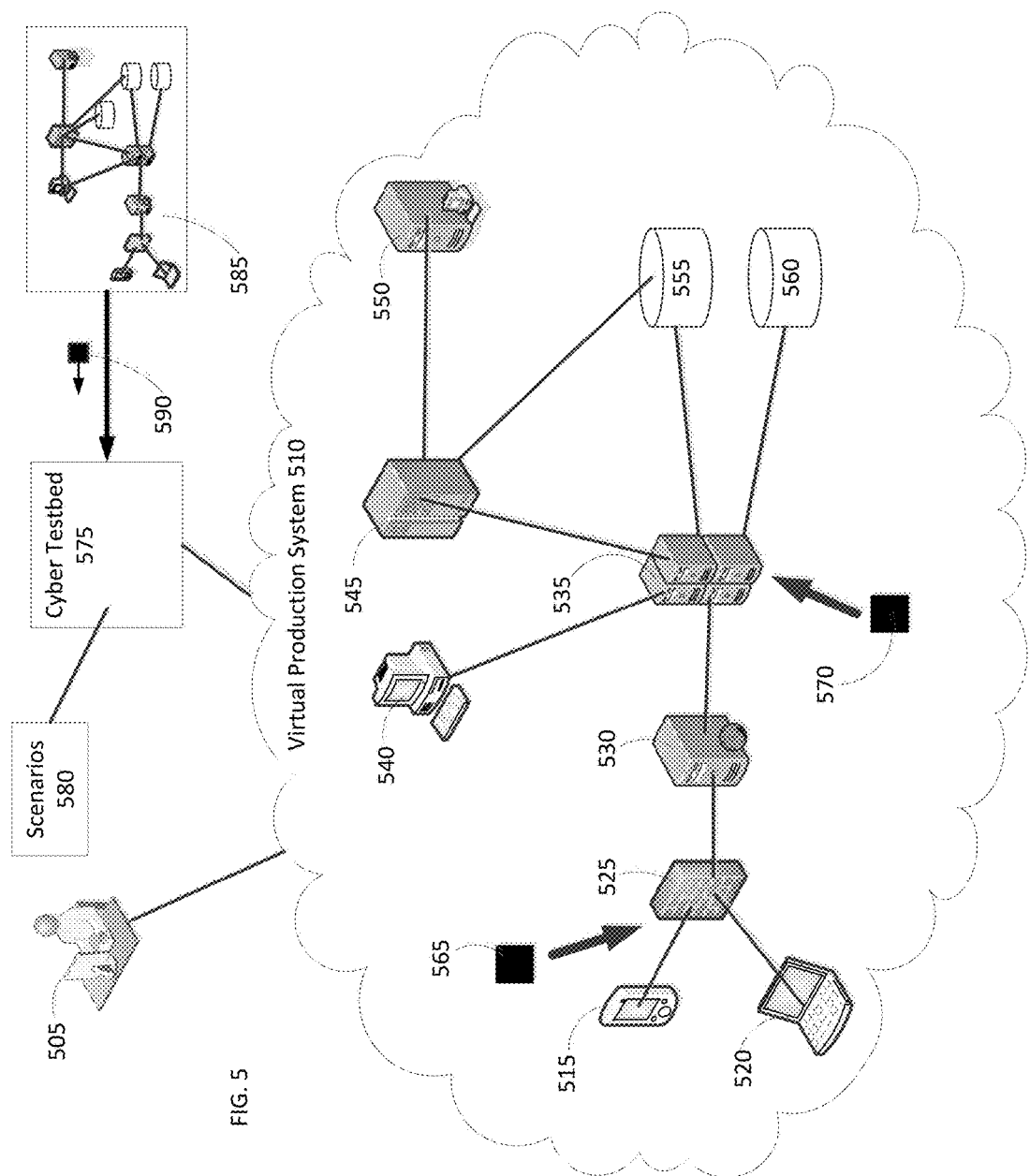
FIG. 5 is a simplified illustration of a cyber testbed providing a virtual production system, in accordance with an embodiment of the present disclosure.

Refer to the example embodiment of FIG. 5. FIG. 5 is a simplified illustration of a cyber testbed providing a virtual production system, in accordance with an embodiment of the present disclosure. In this embodiment, cyber testbed 575 is enabled to receive data in message 590 related to production system 585. Cyber testbed 575 is enabled to create virtual production system 510 based off production system 585. Virtual production system 510 is a replica of a production system 585 similar to the production system shown in FIG. 1. Virtual production system 510 includes web server 530, application server 535, mainframe 545, server 550, database 555, and database 560. Desktop computer 540 is enabled to communicate with other portions of virtual production system 510. Mobile device 515 and laptop 520 are enabled to communicate with web server 530 through firewall 525. User 505 is enabled to monitor, manage, and/or modify virtual production system 510. In many embodiments, a user may access a virtual production system using computer, a lab, and/or other connection to a cyber testbed to monitor, manage, and/or modify a virtual production system. User 505 is enabled to create scenarios 580 using cyber testbed 575. In this embodiment, scenarios 580 are enabled to utilize threat 565 and threat 570 to test the effectiveness of the computing environment, represented by virtual production system 510, at fending off attacks of scenarios 580.

Figure 6:
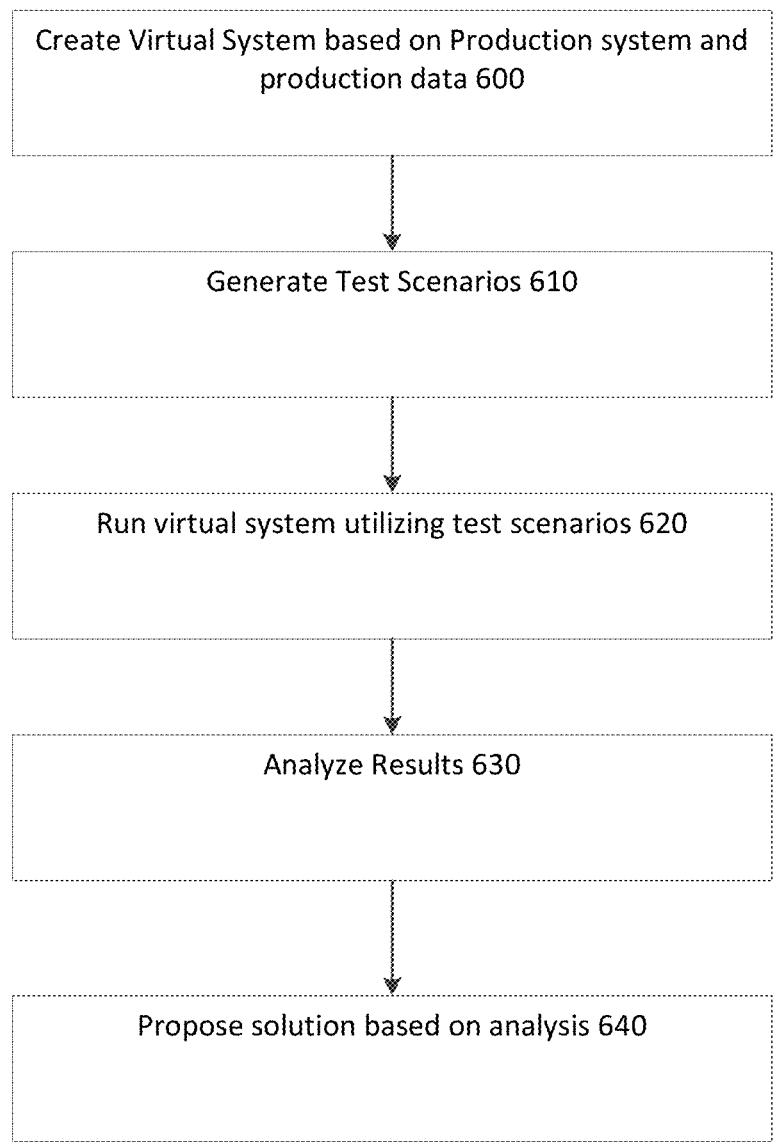
FIG. 6 is a simplified flowchart of a method of using a cyber testbed to perform tests on a virtual system based on a production system, in accordance with an embodiment of the present disclosure.

Refer to the example embodiment of FIGS. 5 and 6. FIG. 6 is a simplified flowchart of a method of using a cyber testbed to perform tests on a virtual system based on a production system, in accordance with an embodiment of the present disclosure. FIG. 5 shows cyber testbed 575 receiving production data and information on production system 585 in message 590. Cyber Testbed 575 creates virtual production system 510 based on production system 585 and production data received in message 590 (Step 600). Virtual production system 510 includes web server 530, application server 535, mainframe 545, server 550, database 555, and database 560. User 505 directs cyber testbed 575 to generate scenarios 580 (Step 610). Scenarios 580 are plans that introduce one or more threats to virtual production system 510. User 505 directs cyber testbed 575 to run virtual production system 510 utilizing scenarios 580 (Step 620). In many embodiments, a cyber testbed may be enabled to execute a scenario one or multiple times to determine whether the same set of events consistently occurs or whether a set of events may be random. Upon completion of each of scenarios 580, cyber testbed 575 analyzes results (Step 630) and provides a business continuity score and/or a security score based on the results. Cyber testbed 575 utilizes a hypothesis generator to propose one or more solutions based on the analysis (Step 640). In many embodiments, a hypothesis generator may provide one or more methods of improving a security score. In other embodiments, a hypothesis generator may provide one or more methods of improving a business continuity score. In some embodiments, a hypothesis generator may provide one or more methods of balancing changes to improve both a security score and a business continuity score.

Figure 7:
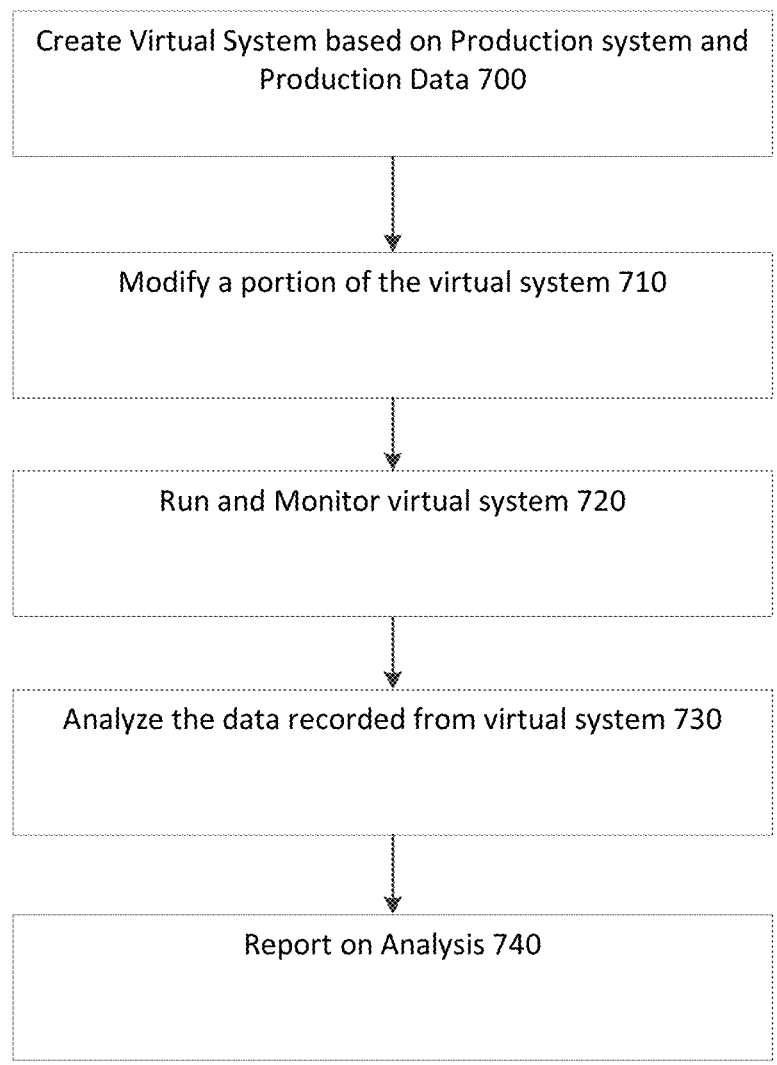
FIG. 7 is a simplified flowchart of a method of determining an improved configuration for a virtual production system based on a production system as shown in FIG. 5, in accordance with an embodiment of the present disclosure.

Refer to the example embodiments of FIGS. 5 and 7. FIG. 7 is a simplified flowchart of a method of determining an improved configuration for a virtual production system based on a production system as shown in FIG. 5, in accordance with an embodiment of the present disclosure. FIG. 5 shows cyber testbed 575 receiving information and production data related to production system 585 in message 590. Cyber testbed 575 uses message 590 to create virtual production system 510 based on production system 585 and production data (Step 700). User 505 utilizes cyber testbed 575 to modify virtual production system 510 (Step 710) to improve security characteristics of virtual production system 510. User 505 directs cyber testbed 575 to run and monitor virtual production system 510 (Step 720). Cyber testbed 575 analyzes data recorded during performance of scenarios 580 upon virtual production system 510 (Step 730). In many embodiments, a cyber testbed may be enabled to compare results of a modified virtual production system with baseline results of an unmodified virtual production system. Cyber testbed 575 reports results of analysis (Step 740) to user 505. In this embodiment, the results include providing a security score and a business continuity score.

Figure 8:
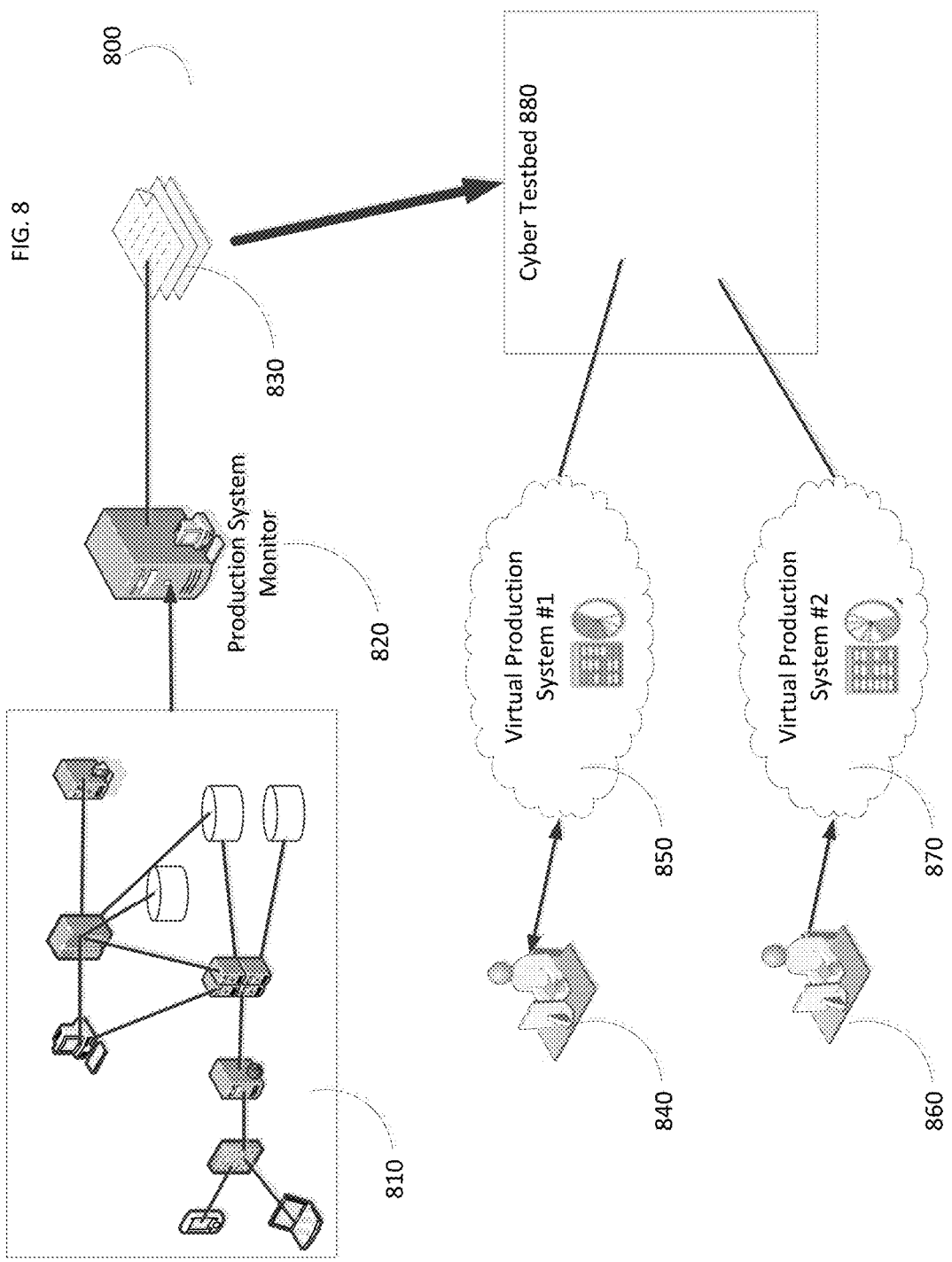
FIG. 8 is a simplified illustration of a cyber testbed providing access to two virtual production system based off a production system, in accordance with an embodiment of the present disclosure.

Refer to the example embodiment of FIG. 8. FIG. 8 is a simplified illustration of a cyber testbed providing access to two virtual production systems based off a production system, in accordance with an embodiment of the present disclosure. System 800 includes production system monitor 820 and cyber testbed 880. Production system monitor 820 is enabled to retrieve information about production system 810 and provide the information to cyber testbed 880 using files 830. In many embodiments, production information files may include, but are not limited to information relating to a topology of a production system, layout of a production system, and/or production data. In various embodiments, production data may enable a cyber testbed to recreate one or more timeframes of usage of a production system. For example, in some embodiments, if a production system goes down multiple times over the course of a day, a production system monitor may be enabled to provide production data from the day the production system went down. In that embodiment, a cyber testbed may be enabled to utilize the production data to reproduce the conditions in which the production site when down.

In this embodiment, cyber testbed 880 is enabled to provide one or multiple virtual production systems based on production system 810. As shown, cyber testbed has provided virtual production system 850 to user 840 and virtual production system 870 to user 860. Each of users 840, 860 are enabled to monitor, manage, and/or modify each respective virtual production system to perform tests and/or system tasks to learn more about the state of production system 810.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
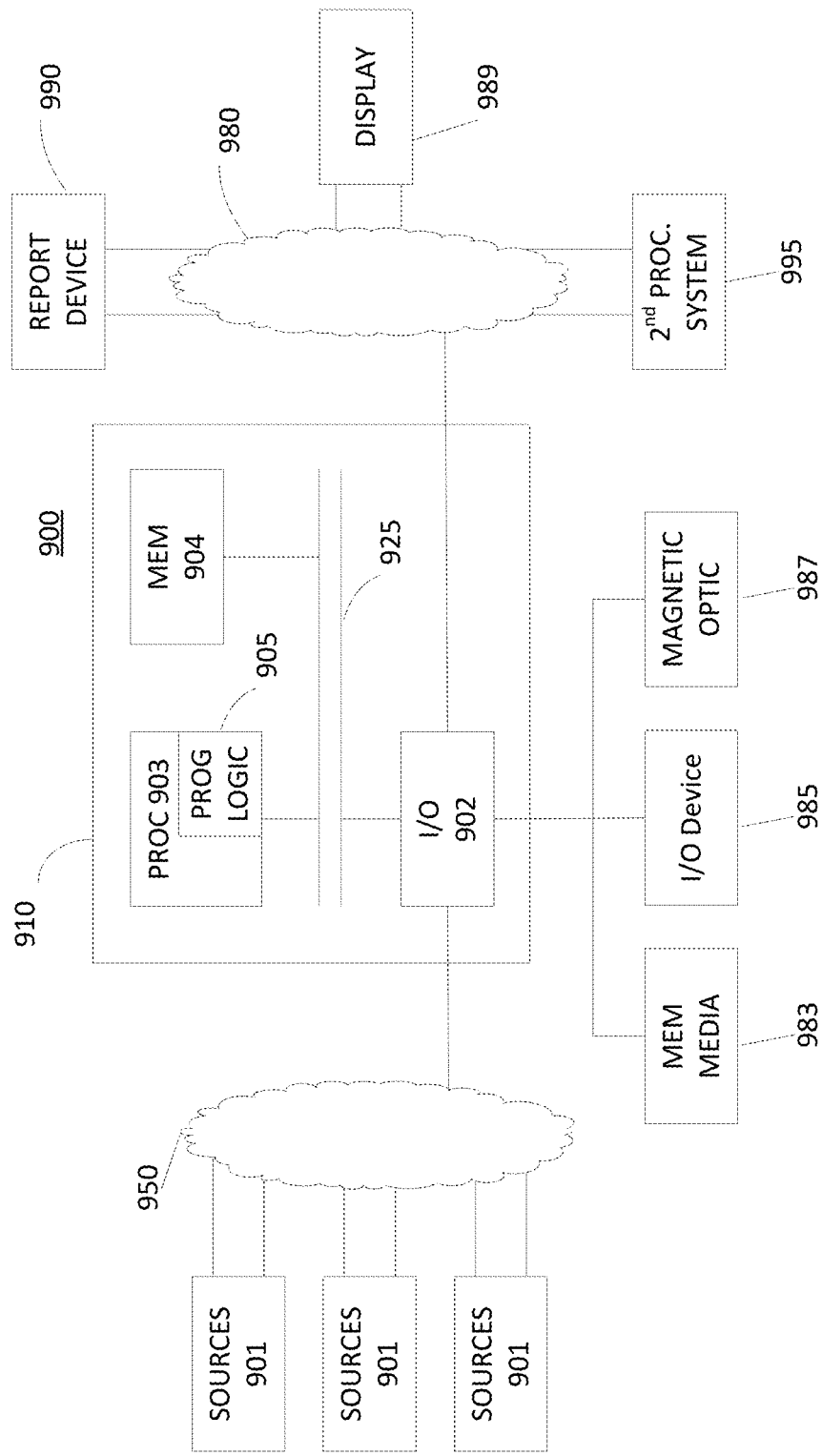
FIG. 9 is an example of an embodiment of an apparatus that may utilize the techniques described herein, in accordance with an embodiment of the present disclosure.

FIG. 9 is a block diagram illustrating an apparatus, such as a computer 910 in a network 900, which may utilize the techniques described herein according to an example embodiment of the present invention. The computer 910 is configured interact with multiple data sources 901 via a network 950. The computer 910 may include one or more I/O ports 902, a processor 903, and memory 904, all of which may be connected by an interconnect 925, such as a bus. Processor 903 may include program logic 905. The I/O ports 902 may provide connectivity to memory media 983, I/O devices 985, and drives 987, such as magnetic drives, optical drives, or Solid State Drives (SSDs). The computer 910 interfaces via a network 980 with a report device 990 and a display 989. The computer 910 also interfaces via the network 980 with an additional processing system denoted as second processing system 995. When the program code is loaded into memory 904 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
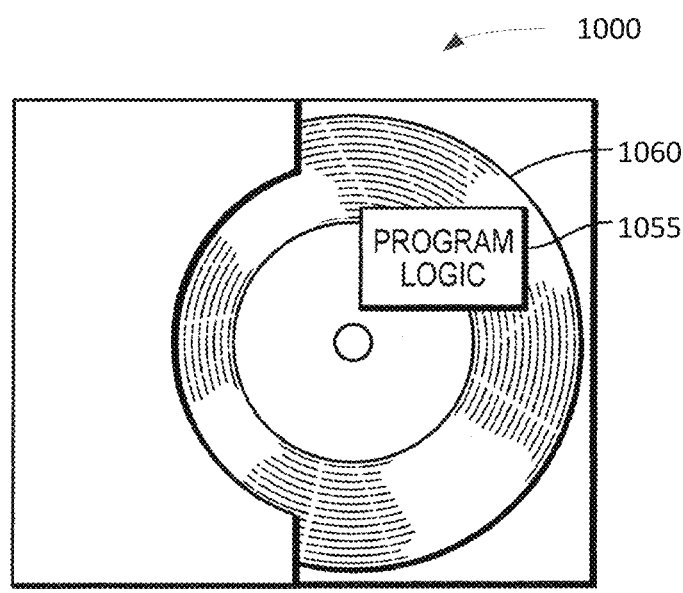
FIG. 10 is an example of a method embodied on a computer readable storage medium that may utilize the techniques described herein, in accordance with an embodiment of the present disclosure.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000. Program Logic 1055 may be the same logic 905 on memory 904 loaded on processor 903 in FIG. 9. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for testing a production system, the computer-executable method comprising:
   receiving information related to the production system;
   receiving production data from the production system, wherein the production data comprises a plurality of data files indicative of one or more operating states of the production system;
   creating a virtual production system, wherein the virtual production system is a replica of the production system using the received information and the received production data, wherein the virtual production system is enabled to be a computing environment with one or more data storage systems and one or more network devices;
   analyzing the production system by performing tests on the virtual production system; and
   providing a simulation to facilitate training on management of the production system using the virtual production system;
   wherein analyzing comprises providing a security score and a business continuity score based on the tests;
   wherein the production data comprises production data associated with a particular timeframe of usage of the production system; and
   wherein the one or more operating states of the production system comprise at least a current operating state of the production system.

2. The computer-executable method of claim 1, wherein performing tests comprises:
   creating at least one scenario; and
   executing the at least one scenario utilizing the virtual production system.

3. The computer-executable method of claim 2, wherein the at least one scenario includes releasing at least one threat into the virtual production system.

4. The computer-executable method of claim 3, wherein the at least one threat is malware.

5. The computer-executable method of claim 3, wherein the at least one threat is a cyber-attack.

6. A system, comprising:
   a production system; and
   computer-executable program logic encoded in memory of one or more computers enabled to test the production system, wherein the computer-executable program logic is configured for the execution of:
   receiving information related to the production system;
   receiving production data from the production system, wherein the production data comprises a plurality of data files indicative of one or more operating states of the production system;
   creating a virtual production system, wherein the virtual production system is a replica of the production system using the received information and the received production data, wherein the virtual production system is enabled to be a computing environment with one or more data storage systems and one or more network devices;
   analyzing the production system by performing tests on the virtual production system; and
   providing a simulation to facilitate training on management of the production system using the virtual production system;
   wherein analyzing comprises providing a security score and a business continuity score based on the tests;
   wherein the production data comprises production data associated with a particular timeframe of usage of the production system; and
   wherein the one or more operating states of the production system comprise at least a current operating state of the production system.

7. The system of claim 6, wherein performing tests comprises:
   creating at least one scenario; and
   executing the at least one scenario utilizing the virtual production system.

8. The system of claim 7, wherein the at least one scenario includes releasing at least one threat into the virtual production system.

9. The system of claim 8, wherein the at least one threat is malware.

10. The system of claim 8, wherein the at least one threat is a cyber-attack.

11. A computer program product for testing a production system,
    the computer program product comprising:
    a non-transitory computer readable medium encoded with computer-executable code, the code configured to enable the execution of:
    receiving information related to the production system;

receiving production data from the production system, wherein the production data comprises a plurality of data files indicative of one or more operating states of the production system;

creating a virtual production system, wherein the virtual production system is a replica of the production system using the received information and the received production data, wherein the virtual production system is enabled to be a computing environment with one or more data storage systems and one or more network devices;

analyzing the production system by performing tests on the virtual production system; and providing a simulation to facilitate training on management of the production system using the virtual production system;

wherein analyzing comprises providing a security score and a business continuity score based on the tests;

wherein the production data comprises production data associated with a particular timeframe of usage of the production system; and wherein the one or more operating states of the production system comprise at least a current operating state of the production system.

12. The computer program product of claim 11, wherein performing tests comprises:

creating at least one scenario; and executing the at least one scenario utilizing the virtual production system.

13. The computer program product of claim 12, wherein the at least one scenario includes releasing at least one threat into the virtual production system.

14. The computer program product of claim 13, wherein the at least one threat is malware.

15. The computer program product of claim 13, wherein the at least one threat is a cyber-attack.

* * * * *